US009161244B2

(12) United States Patent
Chun et al.

(10) Patent No.: US 9,161,244 B2
(45) Date of Patent: Oct. 13, 2015

(54) METHOD FOR TRANSCEIVING SIGNAL IN MULTI-NODE SYSTEM, AND DEVICE THEREFOR

(75) Inventors: Jin Young Chun, Gyeonggi-do (KR); Ki Tae Kim, Gyeonggi-do (KR); Su Nam Kim, Gyeonggi-do (KR); Ji Won Kang, Gyeonggi-do (KR); Bin Chul Ihm, Gyeonggi-do (KR); Sung Ho Park, Gyeonggi-do (KR)

(73) Assignee: LG Electronics Inc., Seoul (KR)

( * ) Notice: Subject to any disclaimer, the term of this patent is extended or adjusted under 35 U.S.C. 154(b) by 201 days.

(21) Appl. No.: 13/992,676

(22) PCT Filed: Dec. 2, 2011

(86) PCT No.: PCT/KR2011/009304
§ 371 (c)(1),
(2), (4) Date: Jun. 7, 2013

(87) PCT Pub. No.: WO2012/077939
PCT Pub. Date: Jun. 14, 2012

(65) Prior Publication Data
US 2013/0260808 A1 Oct. 3, 2013

Related U.S. Application Data

(60) Provisional application No. 61/421,633, filed on Dec. 10, 2010.

(51) Int. Cl.
*H04W 36/00* (2009.01)
*H04W 24/02* (2009.01)
*H04J 11/00* (2006.01)
*H04W 72/04* (2009.01)
*H04B 7/02* (2006.01)
*H04W 24/10* (2009.01)
*H04W 84/04* (2009.01)

(52) U.S. Cl.
CPC ............ *H04W 24/02* (2013.01); *H04J 11/0079* (2013.01); *H04W 72/0406* (2013.01); *H04B 7/022* (2013.01); *H04W 24/10* (2013.01); *H04W 72/0426* (2013.01); *H04W 84/045* (2013.01)

(58) Field of Classification Search
CPC ... H04W 24/10; H04W 48/12; H04W 52/243; H04W 28/048; H04W 84/045; H04W 16/14
USPC ..................................... 455/443, 562.1, 101
See application file for complete search history.

(56) References Cited

U.S. PATENT DOCUMENTS

2010/0189038 A1 7/2010 Chen et al.
2012/0122472 A1* 5/2012 Krishnamurthy et al. . 455/456.1

OTHER PUBLICATIONS

R1-093780, "Estimation of extended PMI feedback signalling required for user intra-cell and inter-cell coordination", 3GPP TSG RAN WG1 #58bis Meeting Oct. 16, 2009.
3GPP TR 36.814 V9.0.0 3$^{rd}$ Generation Partnership Project; Technical Specifiction Group Radio Access Network; Evolved Universal Terrestrial Radio Access (E-UTRA); Further advancements for E-UTRA physical layer aspects (Release 9) Mar. 2010 See section 8.

* cited by examiner

*Primary Examiner* — Tu X Nguyen
(74) *Attorney, Agent, or Firm* — Dentons US LLP

(57) ABSTRACT

Disclosed is a signal transceiving method which can reduce interference between nodes in a multi-node system. The method comprises the steps of: receiving reference signal configuration information from a first node; receiving a reference signal from a second node; measuring interference caused by the second node using the reference signal, and generating interference node information; and transmitting the interference node information to the first node, wherein the reference signal configuration information includes mapping information between the second node and the reference signal, and the interference node information includes an index of the reference signal.

12 Claims, 7 Drawing Sheets

METHOD FOR TRANSCEIVING SIGNAL IN MULTI-NODE SYSTEM, AND DEVICE THEREFOR

This Application is a 35 U.S.C. §371 National Stage Entry of International Application No. PCT/KR2011/009304, filed Dec. 2, 2011, and claims the benefit of U.S. Provisional Application No. 61/421,633, filed Dec. 10, 2010, all of which are incorporated by reference in their entirety herein.

TECHNICAL FIELD

The present invention relates to wireless communication and, more particularly, to a method and apparatus for transmitting and receiving signals, which are capable of reducing the interference of a node in a multi-node system.

BACKGROUND ART

Recently, the data transfer rate over a wireless communication network is rapidly increasing. This results from the appearance and spread of a variety of devices, such as smart phones and tablet PCs which require Machine-to-Machine (M2M) communication and a high data transfer rate. Carrier Aggregation (CA) technology in which more frequency bands are efficiently used in order to meet a higher data transfer rate, Cognitive Radio (CR) technology, multiple antenna technology in which a data capacity is increased within a limited frequency, multiple base station cooperation technology, etc. are recently highlighted.

Furthermore, a wireless communication network is evolving into an increase in the density of accessible nodes around a user. Here, the nodes mean antennas or a group of antennas which are spaced apart from one another at specific intervals. However, the node is not limited to this sense, but can be used as a broader sense. That is, the node can become a pico eNB (PeNB), a home eNB (HeNB), a Remote Radio Head (RRH), a Remote Radio Unit (RRU), a relay, or distributed antennas (or group). A wireless communication system including nodes having a high density can have higher system performance through cooperation between the nodes. That is, if the transmission and reception of nodes are managed by one control station and thus the nodes operates like antennas or a group of antennas for one cell, the nodes can have more excellent system performance as compared with a case where the nodes operate as independent base stations. A wireless communication system including a plurality of nodes is hereinafter referred to as a multi-node system. If each node forming a multi-node system is an antenna, it is called a Distributed Antenna System (DAS).

In a multi-node system, each node may use its own cell identifier (ID) different from an eNB or may use the same cell ID as an eNB. If each node has its own cell ID and performs scheduling and handover, this multi-node system can be considered as a multi-cell system. In a multi-cell system, if cells (i.e., the coverages of nodes) are overlaid with each other, this multi-cell system is referred to as a multi-tier network.

There is a need for a method and apparatus for transmitting and receiving signals which mitigate interference in this multi-node system.

DISCLOSURE

Technical Problem

There are provided a method and apparatus for transmitting and receiving signals, which reduce interference between nodes in a multi-node system.

Technical Solution

A method for a terminal transmitting and receiving signals in a multi-node system in accordance with an aspect of the present invention includes steps of receiving reference signal configuration information from a first node; receiving a reference signal from a second node; measuring interference due to the second node based on the reference signal and generating interference node information; and sending the interference node information to the first node, wherein the reference signal configuration information includes information about mapping between the second node and the reference signal, and the interference node information may include an index of the reference signal.

The reference signal configuration information may include at least one of a configuration number, the number of antenna ports, and the transmission cycle of the reference signal.

The interference node information may further include a cell identifier (ID) of the second node.

The interference node information may include an index of at least one transmission antenna that generates interference, from among a plurality of transmission antennas, if the second node includes the plurality of transmission antennas.

The first node may stop the transmission of a signal through the at least one transmission antenna that generates the interference for specific radio resources, based on the interference node information.

The second node may broadcast at least one of an index of the transmission antenna through which the transmission of the signal has been stopped and information about the specific radio resources.

The second node may allocate transmission power for the transmission antenna through which the transmission of the signal has been stopped to a transmission antenna whose transmission has not been stopped.

The first node may be a base station, and the second node may be a Closed Subscriber Group (CSG) femto base station.

The step of generating the interference node information may be performed only when interference due to the second node is a preset threshold value or higher or the intensity of a signal received from the first node is a preset threshold value or lower.

The method may further include a step of sending the interference node information to the second node.

The second node may stop the transmission of a signal through at least one transmission antenna that generates interference to the terminal for specific radio resources, based on the interference node information.

A terminal of a multi-node system in accordance with another aspect of the present invention includes a Radio Frequency (RF) unit transmitting and receiving radio signals and a processor connected to the RF unit and generating the radio signals, wherein the processor receives reference signal configuration information from a first node, receives a reference signal from a second node, measures interference due to the second node based on the reference signal, generates interference node information, and sends the interference node information to the first node or the second node, the reference signal configuration information includes information about mapping between the second node and the reference signal, and the interference node information may include an index of the reference signal.

The reference signal configuration information may include at least one of a configuration number, the number of antenna ports, and a transmission cycle of the reference signal.

The interference node information may include an index of at least one transmission antenna that generates interference, from among a plurality of transmission antennas, if the second node includes the plurality of transmission antennas.

The processor may generate the interference node information only when interference due to the second node is a preset threshold value or higher or an intensity of a signal received from the first node is a preset threshold value or lower.

Advantageous Effects

In a multi-node system, interference between nodes can be effectively reduced.

MODE FOR INVENTION

The following technology can be used in a variety of multiple access schemes, such as Code Division Multiple Access (CDMA), Frequency Division Multiple Access (FDMA), Time Division Multiple Access (TDMA), Orthogonal Frequency Division Multiple Access (OFDMA), and Single Carrier-Frequency Division Multiple Access (SC-FDMA). CDMA can be implemented using radio technology, such as Universal Terrestrial Radio Access (UTRA) or CDMA2000. TDMA can be implemented by radio technology, such as Global System for Mobile communications (GSM)/General Packet Radio Service (GPRS)/Enhanced Data Rates for GSM Evolution (EDGE). OFDMA can be implemented by radio technology, such as Institute of Electrical and Electronics Engineers (IEEE) 802.11 (Wi-Fi), IEEE 802.16 (WiMAX), IEEE 802.20, or Evolved UTRA (E-UTRA). UTRA is part of a Universal Mobile Telecommunications System (UMTS). $3^{rd}$ Generation Partnership Project (3GPP) Long Term Evolution (LTE) is part of an Evolved UMTS (E-UMTS) using E-UTRA, and it adopts OFDMA in downlink and adopts SC-FDMA in uplink. LTE-Advanced (A) is a subsequent system of LTE. IEEE 802.16m is a subsequent system of IEEE 802.16e.

Figure 1:
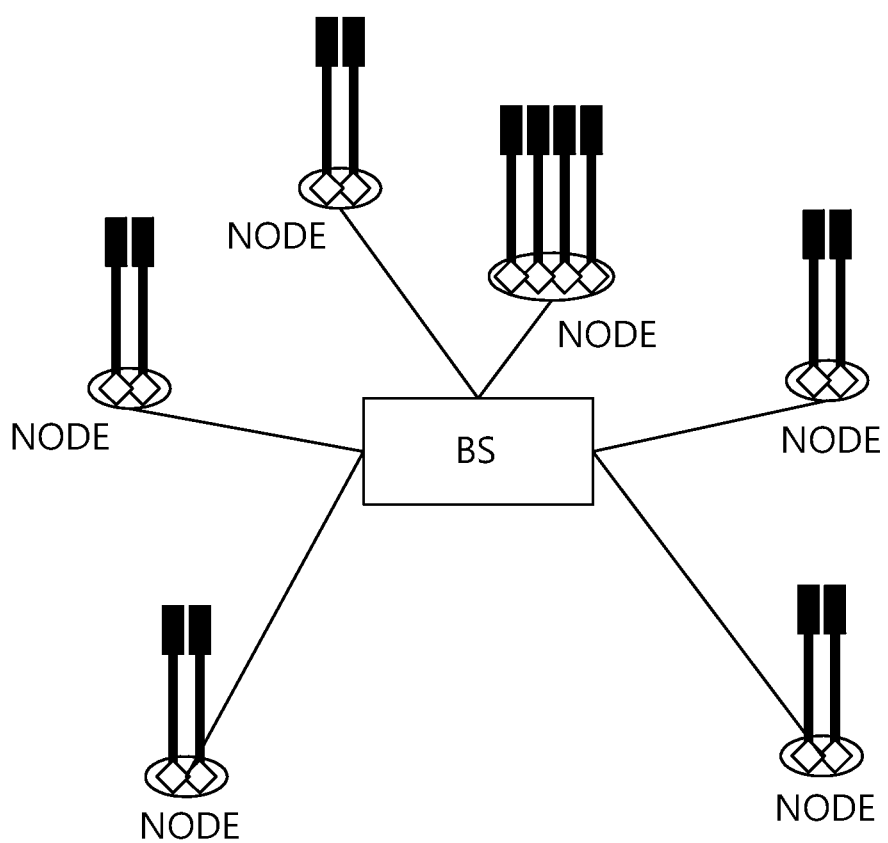
FIG. 1 shows an example of a multi-node system.

FIG. 1 shows an example of a multi-node system.

The multi-node system includes a Base Station (BS) and a plurality of nodes.

The BS provides communication service to a specific geographical area. The BS commonly refers to a fixed station that communicates with terminals, and the BS may also be called another term, such as an evolved-NodeB (eNB), a Base Transceiver System (BTS), or an Advanced Base Station (ABS).

FIG. 1 illustrates distributed antennas as an example of nodes. In this sense, the node can be called an Antenna Node (AN). However, the node are not limited to a distributed antenna, but can be implemented as, for example, BSs, a picocell eNB (PeNB), a home eNB (HeNB), a Remote Radio Head (RRH), or a relay, etc. The node is also called a point. The nodes can be connected to a BS in a wired or wirelessly way and can be controlled/managed by the BS.

From a viewpoint of a terminal, a node can be identified or indicated through a Reference Signal (RS) or a pilot signal. The RS (or pilot signal) is a signal known to a transmission terminal and a reception terminal, and the RS means a signal used in channel measurement, data demodulation, etc. An RS includes, for example, a Channel Status Information-Reference Signal (CSI-RS) regulated in 3GPP LTE-A, a preamble regulated in IEEE 802.16m, a midamble, etc. This RS and a configuration for the RS can be mapped to each node (or the transmission antenna of each node). If information about mapping between the RS configuration and the node is given to a terminal or previously known to the terminal, the terminal can identify the node or the terminal can be informed of the node based on a CSI-RS configuration, and the terminal can obtain channel status information about the corresponding node. The RS configuration can include information about a configuration index, the number of antenna ports of each node, Resource Elements (REs) being used, a transmission cycle, an offset of a transmission time point, etc.

Referring to back to FIG. 1, the antenna nodes are connected to the BS in a wired/wireless way. Each of the antenna nodes can include one antenna or an antenna group (i.e., a plurality of antennas). Antennas belonging to one antenna node are placed within several meters geographically, and they can have the same characteristic. In a multi-antenna node system, an antenna node functions as an Access Point (AP) accessible to a terminal.

If nodes are formed of antennas as described above, this multi-node system is also called a Distributed Antenna System (DAS). That is, a DAS refers to a system in which antennas (i.e., nodes) are distributed and deployed at various positions geographically and the antennas are managed by an eNB. A DAS differs from a conventional Centralized Antenna System (CAS) in that the antennas of an eNB are localized and placed at the center of a cell.

Here, the meaning that antennas are distributed and deployed geographically can mean that one receiver and a plurality of antennas are deployed so that a difference in the channel status between each of the antennas and the receiver is a specific value or higher when the one receiver receives the same signal from the plurality of antennas. The meaning that antennas are localized and deployed can mean that the antennas are densely deployed so that a difference in the channel status between each of the antennas and one receiver is less than a specific value. The specific value can be determined in various ways depending on a frequency and the type of service used in antennas.

Figure 2:
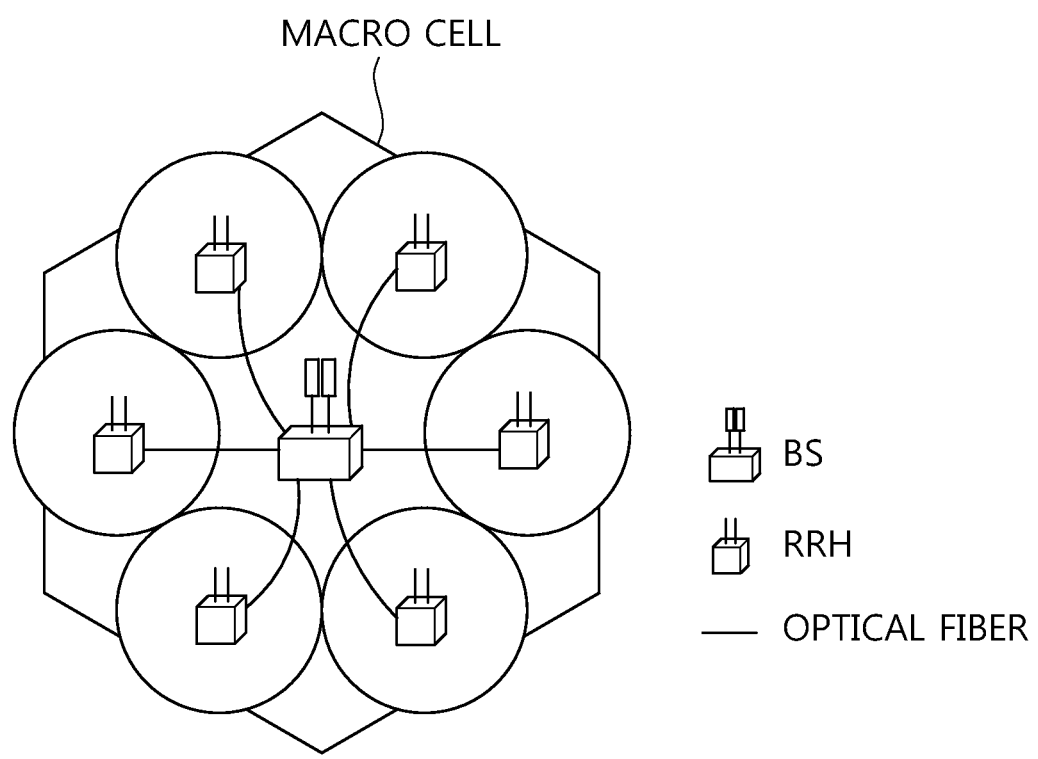
FIG. 2 shows an example of the disposition of nodes in a multi-node system.

FIG. 2 shows an example of the disposition of nodes in a multi-node system.

Referring to FIG. 2, the multi-node system can have a form in which a plurality of nodes is deployed within a macro cell where a BS provides service. That is, the multi-node system can have a heterogeneous network form in which a plurality of nodes having low transmission power is included within the coverage of a macro cell having high transmission power. Here, each node can have a different cell ID from a macro cell (i.e., BS) or can have the same cell ID as the macro cell. The cell ID can be used as a seed number when a synchronization signal, an RS or the like is transmitted, and a terminal can identify the cell ID of the node through the synchronization signal, the RS, etc.

Figure 3:
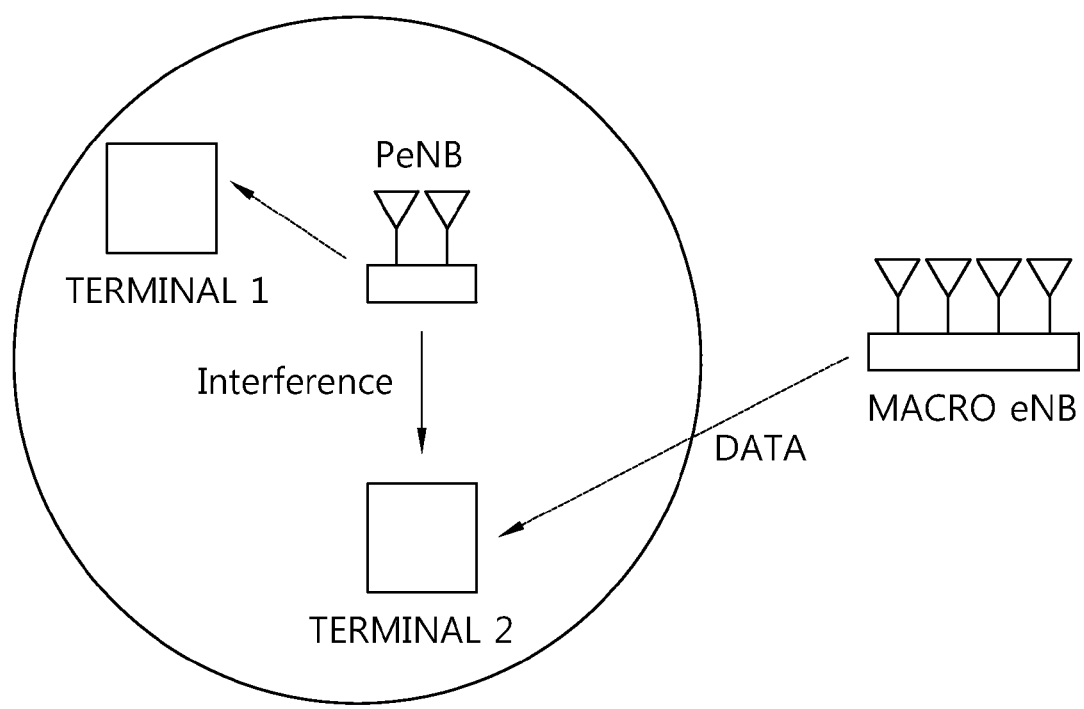
FIG. 3 illustrates a case where interference is problematic in a multi-node system.

FIG. 3 illustrates a case where interference is problematic in a multi-node system.

Referring to FIG. 3, the multi-node system can have a form in which the coverage of a macro eNB is overlaid with the coverage of a picocell eNB (PeNB). Here, the macro eNB and the PeNB can use their cell IDs.

The PeNB may allow only a registered user of the registered user and an unregistered user to be accessed thereto. If only the registered user is allowed to access the PeNB, the PeNB is called a Closed Subscriber Group (CSG) PeNB. If both the registered user and the unregistered user are allowed to access the PeNB, the PeNB is called an Open Subscriber Group (OSG) PeNB. The two methods may be mixed and operated.

When an unregistered terminal is place near a CSG PeNB, an interference problem can occur. For example, when a terminal 2 communicating with a macro eNB is a terminal not registered with a PeNB, but is moved to the coverage of the PeNB, a signal transmitted by the PeNB has a great influence on the terminal 2.

Figure 4:
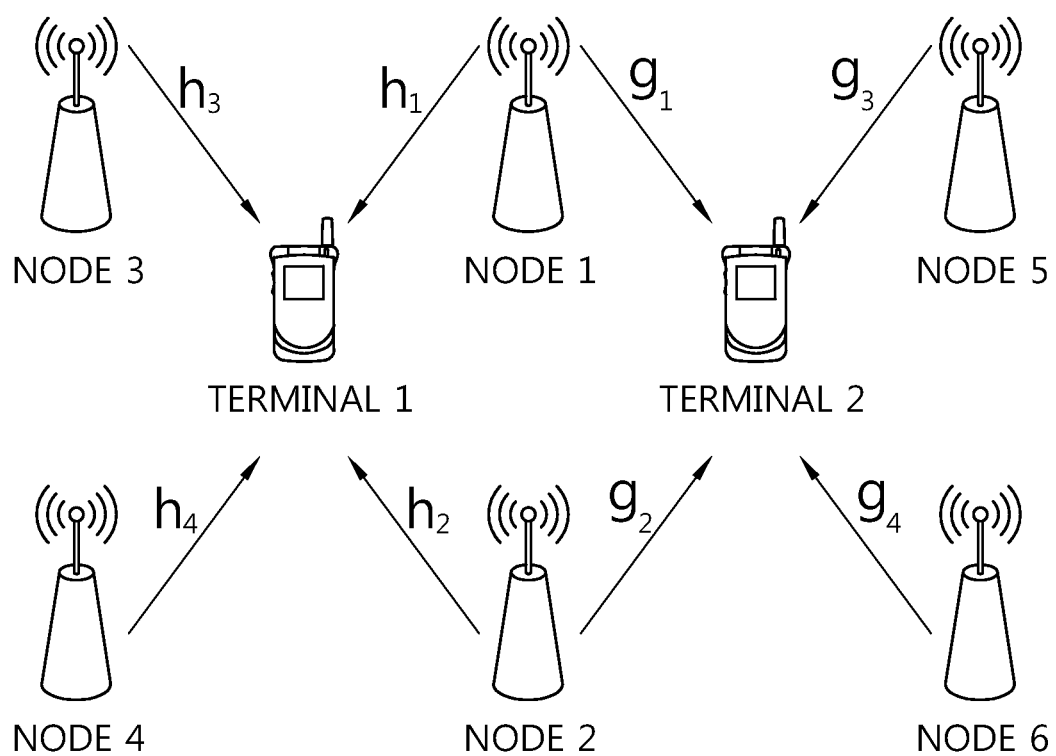
FIG. 4 shows an example of interference between nodes in a multi-node system.

FIG. 4 shows an example of interference between nodes in a multi-node system.

Referring to FIG. 4, a terminal 1 can receive signals from nodes 1, 2, 3, and 4, and a terminal 2 can receive signals from the nodes 1, 2, 5, and 6. Here, the nodes 3 and 4 are sufficiently spaced apart from the terminal 2, and the signals transmitted from the nodes 3 and 4 to the terminal 1 may not interfere with the terminal 2. Furthermore, the nodes 5 and 6 are sufficiently spaced apart from the terminal 1, and the signals transmitted to the terminal 2 may not interfere with the terminal 1.

The nodes 1 and 2 can multiplex the signals, transmitted to the terminal 1 and the terminal 2, within the same radio resource region and send the multiplexed signal. The same radio resource region means a resource region on a time frequency that is formed of the same frequency band and time interval. In this case, the terminal 1 can be subject to interference due to the signals transmitted from the nodes 1 and 2 to the terminal 2. Furthermore, the terminal 2 can be subject to interference due to the signals transmitted from the nodes 1 and 2 to the terminal 1.

In order to solve this interference problem, a variety of methods are being discussed in standards, such as LTE-A and IEEE 802.16m. A method that is currently taken into consideration powerfully is to divide radio resources available for each node so that different nodes can use different radio resources. For example, nodes use different frequencies, times, or codes using Frequency Division Multiplexing (FDM), Time Division Multiplexing (TDM), Code Division Multiplexing (CDM), etc. Or, a method of avoiding interference between nodes through downlink power coordination is also taken into consideration. The methods, however, limit resources available for nodes and have disadvantages, such as the deterioration of system efficiency and scheduling limits.

Accordingly, there is a need for a more efficient method of reducing interference in a multi-node system.

Figure 5:
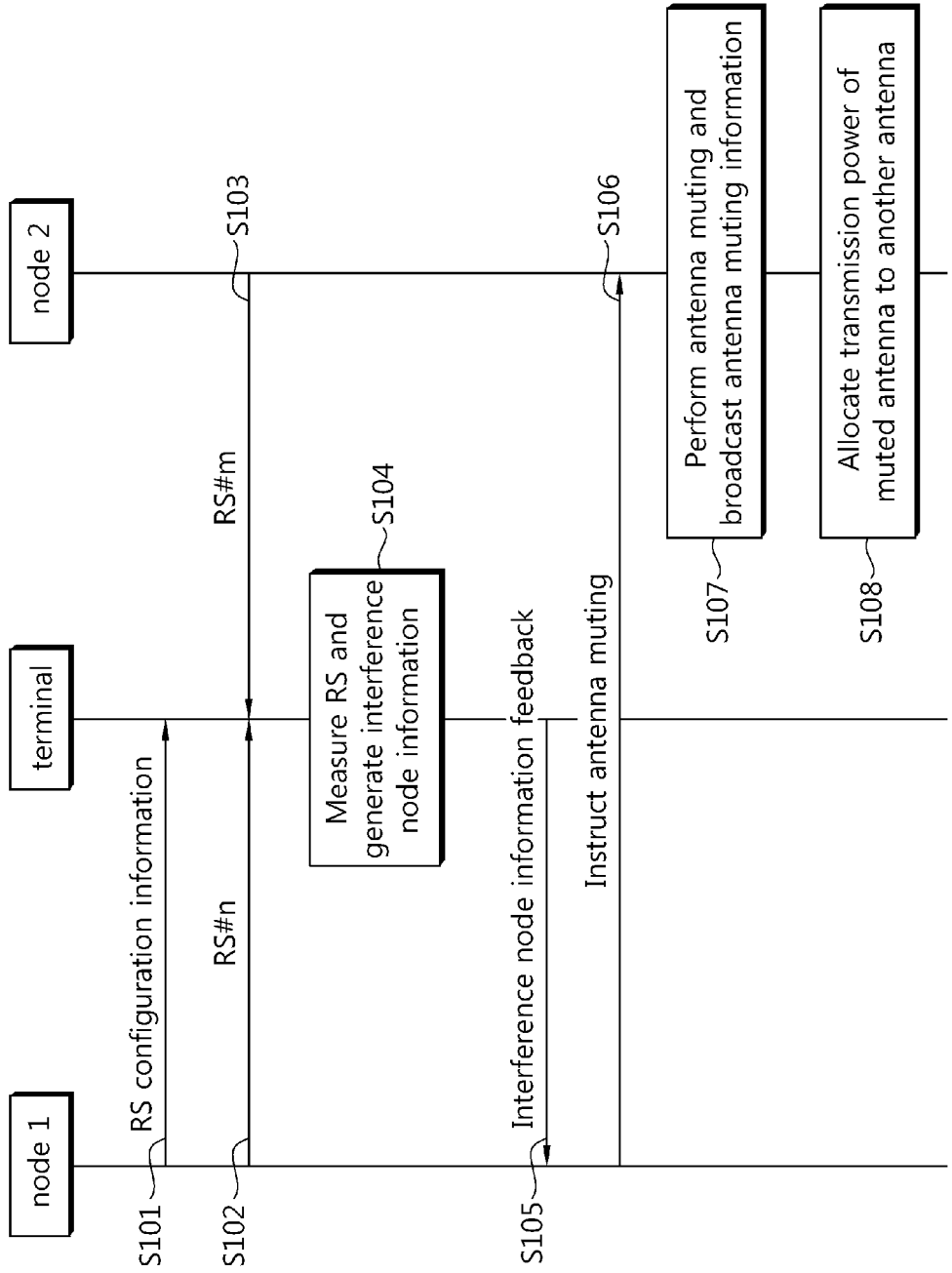
FIG. 5 shows a method of reducing interference in a multi-node system in accordance with an embodiment of the present invention.

FIG. 5 shows a method of reducing interference in a multi-node system in accordance with an embodiment of the present invention. FIG. 5 illustrates an example in which the multi-node system includes two nodes, that is, a node 1 and a node 2, for convenience of description, but the present invention is not limited thereto.

In FIG. 5, the node 1 is a serving node which provides service to a terminal and can be a macro eNB. The node 2 is an interfering node which gives interference to the terminal and may be a CSG PeNB. The node 2 may be present within the coverage of the node 1.

The node 1 provides RS configuration information to the terminal (S101). The RS configuration information can include information about mapping between each node within the multi-node system and an RS configuration. For example, if the number of available RS configurations is plural, the RS configuration information can include information about that each RS configuration is connected to what node or each RS configuration is mapped to the antenna of what node.

The RS can be, for example, a CSI-RS. Here, the RS configuration information can additionally include 1. The number of CSI-RS ports, 2. A CSI-RS configuration number indicative of a CSI-RS configuration, 3. A CSI-RS subframe configuration number $I_{CSI-RS}$ indicative of the transmission cycle and time point of the CSI-RS, etc. The RS configuration information can be given through higher layer signaling.

Here, the CSI-RS may include 32 configurations, and the CSI-RS can be used to reduce interference between nodes in a multi-node system including a heterogeneous network environment.

The configuration for the CSI-RS is different depending on the number of antenna ports of a node, and different configurations are given to neighboring nodes to a maximum extent. The CSI-RS is classified depending on a CP type and is classified into a configuration applied to both a frame structure type 1 and a frame structure type 2 and a configuration applied to only the frame structure type 2 depending on a frame structure type (the frame structure type 1 is FDD and the frame structure type 2 is TDD).

The CSI-RS supports a maximum of 8 antenna port, and an antenna port p may be $\{15\}$, $\{15, 16\}$, $\{15,16,17,18\}$, $\{15, \ldots, 22\}$. That is, the CSI-RS supports 1, 2, 4, or 8 antenna ports. An interval $\Delta f$ between subcarriers is defined for only 15 KHz.

An RS sequence $r_{l,n_s}(m)$ for the CSI-RS is generated as in the following equation.

$$r_{l,n_s}(m) = \frac{1}{\sqrt{2}}(1 - 2 \cdot c(2m)) + j\frac{1}{\sqrt{2}}(1 - 2 \cdot c(2m + 1)),$$ [Equation 1]

$$m = 0, 1, \ldots, N_{RB}^{max,DL} - 1$$

where $$c_{init} =$$

$$2^{10} \cdot (7 \cdot (n_s + 1) + l + 1) \cdot (2 \cdot \Lambda_{ID}^{cell} + 1) + 2 \cdot N_{ID}^{cell} + N_{CP}$$

$$N_{CP} = \begin{cases} 1 & \text{for normal } CP \\ 0 & \text{for extended } CP \end{cases}$$

In Equation 1, $n_s$ is a slot number within a radio frame, and l is an OFDM symbol number within a slot. c(i) is a pseudo random sequence. The pseudo random sequence is started from $c_{init}$ at each OFDM symbol. $N_{ID}^{cell}$ means a physical layer cell ID. $N_{RB}^{max,DL}$ means a maximum number of RBs allocated to downlink.

In subframes configured to transmit a CSI-RS, the RS sequence $r_{l,n_s}(m)$ is mapped to a complex modulation symbol $a_{k,l}^{(p)}$ used as a reference symbol for the antenna port p.

A relation between $r_{l,n_s}(m)$ and $a_{k,l}^{(p)}$ is given as in the following equation.

$$a_{k,l}^{(p)} = w_{l''} \cdot r_{l,n_s}(m')$$ [Equation 2]

where $$k = k' + 12m +$$

$$\begin{cases} -0 & \text{for } p \in \{15, 16\}, \text{ normal cyclic prefix} \\ -6 & \text{for } p \in \{17, 18\}, \text{ normal cyclic prefix} \\ -1 & \text{for } p \in \{19, 20\}, \text{ normal cyclic prefix} \\ -7 & \text{for } p \in \{21, 22\}, \text{ normal cyclic prefix} \\ -0 & \text{for } p \in \{15, 16\}, \text{ extended cyclic prefix} \\ -3 & \text{for } p \in \{17, 18\}, \text{ extended cyclic prefix} \\ -6 & \text{for } p \in \{19, 20\}, \text{ extended cyclic prefix} \\ -9 & \text{for } p \in \{21, 22\}, \text{ extended cyclic prefix} \end{cases}$$

$$w_{l''} = \begin{cases} 1 & p \in \{15, 17, 19, 21\} \\ (-1)^{l''} & p \in \{16, 18, 20, 22\} \end{cases}$$

$$l'' = 0, 1$$

$$m = 0, 1, \ldots, N_{RB}^{DL} - 1$$

$$m' = m + \left\lfloor \frac{N_{RB}^{max,DL} - N_{RB}^{DL}}{2} \right\rfloor$$

In Equation 2, (k', l') and $n_s$ are given in Table 1 below (normal CP). The CSI-RS can be transmitted in a downlink slot in which ($n_s$ mod 2) satisfies the conditions of Table 1 (mod means modular operation. That is, mod means the remainder obtained by dividing $n_s$ by 2).

Table 1 below shows CSI-RS configurations for a normal CP.

TABLE 1

| | CSI reference signal configuration | Number of CSI reference signals configured | | | | | |
|---|---|---|---|---|---|---|---|
| | | 1 or 2 | | 4 | | 8 | |
| | | (k', l') | $n_s$ mod 2 | (k', l') | $n_s$ mod 2 | (k', l') | $n_s$ mod 2 |
| Frame structure type 1 and 2 | 0 | (9, 5) | 0 | (9, 5) | 0 | (9, 5) | 0 |
| | 1 | (11, 2) | 1 | (11, 2) | 1 | (11, 2) | 1 |
| | 2 | (9, 2) | 1 | (9, 2) | 1 | (9, 2) | 1 |
| | 3 | (7, 2) | 1 | (7, 2) | 1 | (7, 2) | 1 |
| | 4 | (9, 5) | 1 | (9, 5) | 1 | (9, 5) | 1 |
| | 5 | (8, 5) | 0 | (8, 5) | 0 | | |
| | 6 | (10, 2) | 1 | (10, 2) | 1 | | |
| | 7 | (8, 2) | 1 | (8, 2) | 1 | | |
| | 8 | (6, 2) | 1 | (6, 2) | 1 | | |
| | 9 | (8, 5) | 1 | (8, 5) | 1 | | |
| | 10 | (3, 5) | 0 | | | | |
| | 11 | (2, 5) | 0 | | | | |
| | 12 | (5, 2) | 1 | | | | |
| | 13 | (4, 2) | 1 | | | | |
| | 14 | (3, 2) | 1 | | | | |
| | 15 | (2, 2) | 1 | | | | |
| | 16 | (1, 2) | 1 | | | | |
| | 17 | (0, 2) | 1 | | | | |
| | 18 | (3, 5) | 1 | | | | |
| | 19 | (2, 5) | 1 | | | | |
| Frame structure type 2 only | 20 | (11, 1) | 1 | (11, 1) | 1 | (11, 1) | 1 |
| | 21 | (9, 1) | 1 | (9, 1) | 1 | (9, 1) | 1 |
| | 22 | (7, 1) | 1 | (7, 1) | 1 | (7, 1) | 1 |
| | 23 | (10, 1) | 1 | (10, 1) | 1 | | |
| | 24 | (8, 1) | 1 | (8, 1) | 1 | | |
| | 25 | (6, 1) | 1 | (6, 1) | 1 | | |
| | 26 | (5, 1) | 1 | | | | |
| | 27 | (4, 1) | 1 | | | | |
| | 28 | (3, 1) | 1 | | | | |
| | 29 | (2, 1) | 1 | | | | |
| | 30 | (1, 1) | 1 | | | | |
| | 31 | (0, 1) | 1 | | | | |

$$l = l' + \begin{cases} l'' & \text{CSI reference signal configurations 0-19,} \\ & \text{normal cyclic prefix} \\ 2l'' & \text{CSI reference signal configurations 20-31,} \\ & \text{normal cyclic prefix} \\ l'' & \text{CSI reference signal configurations 0-27,} \\ & \text{extended cyclic prefix} \end{cases}$$

Figure 6:
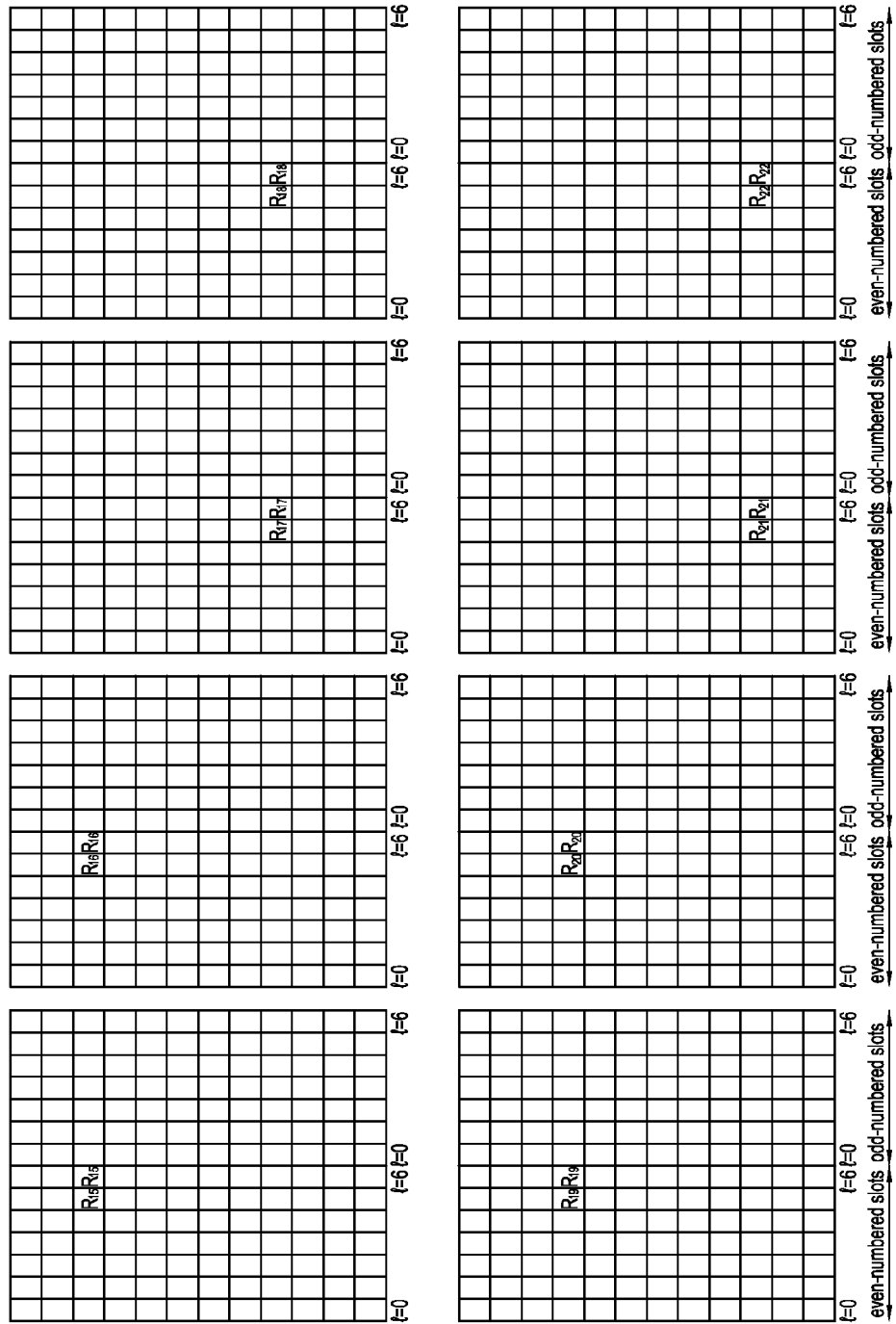
FIG. 6 shows an example of a CSI-RS configuration on a resource grid.

FIG. 6 shows an example of a CSI-RS configuration on a resource grid.

The CSI-RS can be transmitted through two same contiguous resource elements for two antenna ports, for example, p={15, 16}, {17, 18}, {19, 20}, {21, 22}. Here, different Orthogonal Cover Codes (OCCs) are applied. That is, the CSI-RS is transmitted through resource elements that are the same for two antenna ports, and CSI-RSs for respective antenna ports are classified through OCCs.

The CSI-RS is not transmitted 1. in a special subframe having the frame structure type 2, 2. when the CSI-RS collides against a synchronization signal, a physical broadcast channel (PBCH), and a System Information Block (SIB), 3. In a subframe in which a paging message is transmitted, etc.

Referring back to FIG. 5, the node 1 sends an RS #n to the terminal (S102), and the node 2 sends an RS #m to the terminal (S103). That is, the nodes 1 and 2 can send the RSs having different RS configurations.

The terminal measures the RSs and generates interference node information (S104).

If the terminal determines that interference is severe, the terminal can generate interference node information. For example, if a Carrier to Interference and Noise Ratio (CINR) of the RS transmitted by the node 1 does not exceed a predefined threshold value or Receive Signal Strength Indication (RSSI) of the RS transmitted by the node 2 exceeds the predefined threshold value, the terminal can determine that interference is severe.

If the terminal already knows the cell IDs and the number of transmission antennas of the nodes, the terminal can measure the RSs of the respective nodes and know the degree of interference for each of the antennas of the nodes. The terminal generates interference node information about neighboring nodes that give interference based on the results of the measurement. The interference node information can include, for example, at least one of a cell ID (node ID) of an interfering node, an antenna/antenna port index that gives interference, the intensity of a signal for the corresponding antenna/antenna port, and an index of a corresponding RS. The index of the RS can be a value indicative of an RS configuration.

The terminal feeds the interference node information back to the node 1 (S105). The node 1 can know an interfering node that gives interference to the terminal, the transmission antennas of the interfering node, etc. based on the interference node information. An example in which the terminal feeds the interference node information back to the node 1 has been described, but the present invention is not limited to the example. That is, the terminal may feed the interference node information back to the node 2. In this case, radio resources for feeding back the interference node information must be previously allocated. If a contention-based channel, such as a ranging channel, is used, the contention-based channel can be previously designated so that a specific code can be used to request resource allocation for the interference node information feedback.

The node 1 instructs the node 2 to perform antenna muting (S106). If the terminal feeds the interference node information back to the node 2, this step may be omitted, and the node 2 may perform antenna muting autonomously.

The node 2 mutes a transmission antenna, giving interference to the terminal, according to the antenna muting instruction of the node 1 and broadcasts antenna muting information (S107).

The antenna muting means that a signal is not transmitted in a specific resource region or transmission power is set to '0'. Antenna-off means that any signal is not transmitted in a corresponding transmission antenna, whereas antenna muting means that a signal is not transmitted in a specific resource region.

The antenna muting information can include at least one of a muted antenna/antenna port index, information about a muted resource region, and the number of antennas changed by the antenna muting.

The node 2 can include the antenna muting information in a broadcast message and sends the message. For example, the node 2 operating according to 802.16m can broadcast the antenna muting information using an AAI-SON-ADV message.

The following table shows an example of the AAI-SON-ADV message.

TABLE 2

| M/O | Attributes/Array of attributes | Size (bits) | Value/Note | Conditions |
| --- | --- | --- | --- | --- |
| M | Action type | 2 | Used to indicate the purpose of this message<br>0b00: ABS Reconfiguration<br>0b01: ABS Restart<br>0b10: ABS Scanning<br>0b11: ABS Reliability | mandatory |
| O | Unavailable start time (UST) | | Start of unavailable time | shall present if Action type = (0b00, 0b01, 0b10)<br>may present if Action type = 0b11 |
| O | Unavailable Time Interval (UTI) | | Interval of unavailable time | shall present if Action type = (0b00, 0b01, 0b10)<br>may present if Action type = 0b11 |
| M/O | Reason | 2 | 0b00: Power down<br>0b01: Power reduction<br>0b10: FA change<br>0b11: Backhaul link down | If Action type = 0b11, it is mandatory, otherwise it will not exist. |
| M/O | Tx power reduction | | dB value of Tx power reduction | If Reason = 0b01, it is mandatory. |
| M/O | FA index | | FA index | If Reason = 0b10, it is mandatory. |
| M/O | Time of power down | | Expected power down time or resource adjustment time or current FA downtime | If Action type = 0b11, it is mandatory, otherwise it will not exist. |
| M/O | Expected uptime or new FA uptime | | | If Action type = 0b11, it is optional, otherwise it will not exist. |

TABLE 2-continued

| M/O | Attributes/Array of attributes | Size (bits) | Value/Note | Conditions |
|---|---|---|---|---|
| M/O | New IDcell | | New IDcell that the ABS will use after the reconfiguration process. | If Action type = 0b00, it is optional, otherwise, it will not exist. |
| O | Recommended BSID list | | Recommended BSID list | It is optional to help AMS to HO. |

In Table 2, 'Reason' indicates transmission power-down, a reduction of transmission power, a change of an allocated frequency, backhaul link-down, etc. depending on a value of Reason. An 'Unavailable Time Interval (UTI)' includes information about the time that is not available.

The node 2 can include the antenna muting information in the AAI-SON-ADV message and broadcast the AAI-SON-ADV message. The broadcast message can be considered to be for the terminal that is served by the node 2. That is, the broadcast message provides terminals, served by the node 2, with information indicating that a specific antenna mutes a specific resource region and sends a signal in the subsequent transmission of signals. From a viewpoint of the terminal served by the node 1, interference from the node 2 is reduced because the node 2 mutes a transmission antenna that generates interference.

In FIG. 5, an example in which the node 2 includes the antenna muting information in a broadcast message and sends the broadcast message has been described, but the present invention is not limited to the example. That is, the node 2 may multicast or unicast the antenna muting information.

Or, the node 2 may not explicitly send the antenna muting information to a served terminal. Instead, the node 2 may perform antenna muting by sending a signal in resource regions other than radio resources subject to antenna muting in an 'Allocation A-MAP IE' by using an MIMO method to which antenna grouping/antenna selection, etc. are applied. Furthermore, the antenna muting information may be transmitted from the node 1 to the terminal.

The node 2 allocates the transmission power of a muted antenna to another antenna (S108). In this case, since the total transmission power of the node 2 is equally maintained before and after the antenna muting, a capacity loss can be reduced. Here, information indicating that the transmission power of another antenna is increased, together with the antenna muting information, can be included in the AAI-SON-ADV message.

Figure 7:
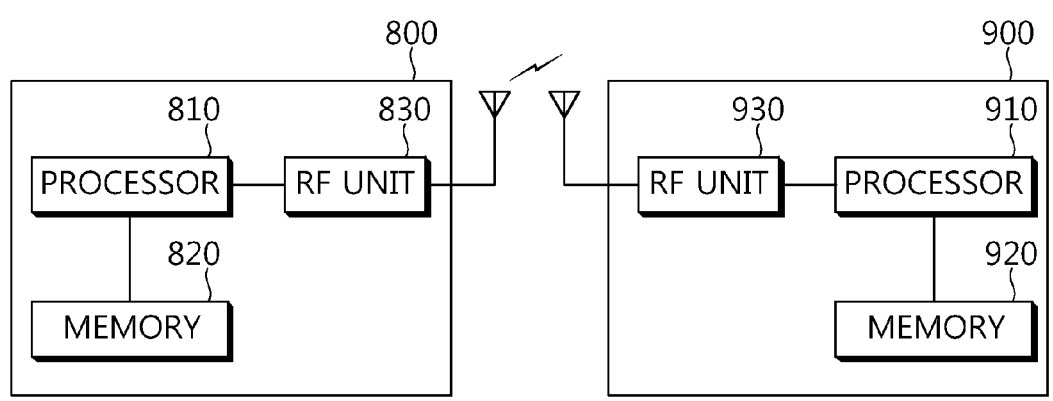
FIG. 7 is a block diagram of an eNB and a terminal in which the embodiments of the present invention are implemented.

FIG. 7 is a block diagram of a BS and a terminal in which the embodiments of the present invention are implemented.

The BS 800 includes a processor 810, a memory 820, and a Radio Frequency (RF) unit 830. The BS 800 can control a plurality of nodes in a multi-node system. The processor 810 implements the proposed functions, processes and/or methods. The layers of a radio interface protocol can be implemented by the processor 810. The processor 810 generates/sends RS configuration information and receives interference node information from the terminal 900. The processor 810 instructs a node (or a specific transmission antenna of the node), giving interference to the terminal 900, to stop the transmission of a signal in a specific radio resource region based on the interference node information. The memory 820 is connected to the processor 810, and the memory 820 stores various pieces of information for driving the processor 810. The RF unit 830 is connected to the processor 810, and the RF unit 830 sends and/or receives radio signals.

The terminal 900 includes a processor 910, a memory 920, and an RF unit 930. The RF unit 930 is connected to the processor 910, and the RF unit 930 sends and/or receives radio signals. The processor 910 implements the proposed functions, processes and/or methods. That is, the processor 910 receives RS configuration information from the BS and receives a reference signal from at least one node. The processor 910 measures the received reference signal, generates interference node information, and sends the generated interference node information to the BS or a node that generates interference. The layers of a radio interface protocol can be implemented by the processor 910. The memory 920 is connected to the processor 910, and the memory 920 stores various pieces of information for driving the processor 910.

The processor 810, 910 can include Application-Specific Integrated Circuits (ASICs), other chipsets, logic circuits and/or data processors. The memory 820, 920 can include Read-Only Memory (ROM), Random Access Memory (RAM), flash memory, memory cards, storage media and/or other storage devices. The RF unit 820, 930 can include a baseband circuit for processing radio signals. When the above-described embodiment is implemented in software, the above-described scheme can be implemented into a module (process or function) that performs the above function. The module can be stored in the memory 820, 920 and executed by the processor 810, 910. The memory 820, 920 can be placed inside or outside the processor 810, 910 and can be coupled with the processor 810, 910 using a variety of well-known means. In the above exemplary system, although the methods have been described based on the flowcharts in the form of a series of steps or blocks, the present invention is not limited to the sequence of the steps, and some of the steps may be performed in a different order from that of other steps or may be performed simultaneous to other steps. Furthermore, those skilled in the art will understand that the steps shown in the flowchart are not exclusive and the steps may include additional steps or that one or more steps in the flowchart may be deleted without affecting the scope of the present invention.

The above embodiments include various aspects of examples. Although all possible combinations for representing the various aspects may not be described, those skilled in the art will appreciate that other combinations are possible. Accordingly, the present invention should be construed as including all other replacements, modifications, and changes which fall within the scope of the claims.

The invention claimed is:

1. A method of a terminal transmitting and receiving signals in a multi-node system, the method comprising:
   receiving reference signal configuration information from a first node;
   receiving a reference signal from a second node;
   measuring interference due to the second node based on the reference signal and generating interference node information; and
   transmitting the interference node information to the first node, wherein the reference signal configuration information comprises information about mapping between the second node and the reference signal, wherein the interference node information comprises an index of the reference signal, wherein the interference node information further comprises a cell identifier (ID) of the second node, and wherein the interference node information comprises an index of at least one transmission antenna that generates interference, from among a plurality of transmission antennas, if the second node comprises a plurality of transmission antennas.

2. The method of claim 1, wherein the reference signal configuration information comprises at least one of a configuration number, a number of antenna ports, and a transmission cycle of the reference signal.

3. The method of claim 1, wherein the first node stops transmission of a signal through the at least one transmission antenna that generates the interference for specific radio resources, based on the interference node information.

4. The method of claim 3, wherein the second node broadcasts at least one of an index of the transmission antenna through which the transmission of the signal has been stopped and information about the specific radio resources.

5. The method of claim 3, wherein the second node allocates transmission power for the transmission antenna through which the transmission of the signal has been stopped to a transmission antenna whose transmission has not been stopped.

6. The method of claim 1, wherein:
the first node is a base station, and
the second node is a Closed Subscriber Group (CSG) femto base station.

7. The method of claim 1, wherein the step of generating the interference node information is performed only when interference due to the second node is a preset threshold value or higher or an intensity of a signal received from the first node is a preset threshold value or lower.

8. The method of claim 1, further comprising:
transmitting the interference node information to the second node.

9. The method of claim 8, wherein the second node stops transmission of a signal through at least one transmission antenna that generates interference to the terminal for specific radio resources, based on the interference node information.

10. A terminal of a multi-node system, comprising:
a Radio Frequency (RF) unit transmitting and receiving radio signals; and
a processor connected to the RF unit and generating the radio signals,
wherein the processor receives reference signal configuration information from a first node, receives a reference signal from a second node, measures interference due to the second node based on the reference signal, generates interference node information, and transmits the interference node information to the first node or the second node,
wherein the reference signal configuration information comprises information about mapping between the second node and the reference signal,
wherein the interference node information comprises an index of the reference signal,
wherein the interference node information further comprises a cell identifier (ID) of the second node, and
wherein the interference node information comprises an index of at least one transmission antenna that generates interference, from among a plurality of transmission antennas, if the second node comprises a plurality of transmission antennas.

11. The terminal of claim 10, wherein the reference signal configuration information comprises at least one of a configuration number, a number of antenna ports, and a transmission cycle of the reference signal.

12. The terminal of claim 10, wherein the processor generates the interference node information only when interference due to the second node is a preset threshold value or higher or an intensity of a signal received from the first node is a preset threshold value or lower.

\* \* \* \* \*